(12) United States Patent
Valencia Carrio et al.

(10) Patent No.: US 10,023,237 B2
(45) Date of Patent: Jul. 17, 2018

(54) BEAM FOR PRODUCING A METAL FRAMEWORK

(71) Applicant: AUTOTECH ENGINEERING A.I.E, Amorebieta-Etxano (ES)

(72) Inventors: Xavier Valencia Carrio, Manresa (ES); Sergi Marquez Duran, Rajadell (ES); Lluis Espana De Juan, Llica de Vall (ES); Christophe Cazes, Versailles (FR); Gregory Gatard, Leuville sur Orge (FR); Vincent Barelli, La Ville du Bois (FR); Emmanuel Leroy, Verrieres le Buisson (FR); Matthieu Dunand, Paris (FR); Matthieu Niess, Avallon (FR)

(73) Assignee: AUTOTECH ENGINEERING A.I.E., Amorebieta-Etxano (ES)

( * ) Notice: Subject to any disclaimer, the term of this patent is extended or adjusted under 35 U.S.C. 154(b) by 95 days.

(21) Appl. No.: 15/035,706

(22) PCT Filed: Nov. 14, 2014

(86) PCT No.: PCT/EP2014/074689
§ 371 (c)(1),
(2) Date: May 10, 2016

(87) PCT Pub. No.: WO2015/071444
PCT Pub. Date: May 21, 2015

(65) Prior Publication Data
US 2016/0280270 A1    Sep. 29, 2016

(30) Foreign Application Priority Data

Nov. 15, 2013  (FR) ..................................... 13 61220
Apr. 7, 2014   (EP) ..................................... 14382133

(51) Int. Cl.
*B62D 25/04* (2006.01)
*B62D 25/02* (2006.01)
(Continued)

(52) U.S. Cl.
CPC .............. *B62D 25/04* (2013.01); *B60R 19/18* (2013.01); *B62D 21/15* (2013.01); *B62D 21/157* (2013.01);
(Continued)

(58) Field of Classification Search
CPC ...... B62D 25/04; B62D 25/025; B62D 21/15; B62D 21/157; B60R 19/18
(Continued)

(56) References Cited

U.S. PATENT DOCUMENTS 6,419,302 B2    7/2002  Mikuni et al.
6,986,536 B1    1/2006  Heatherington et al.
(Continued)

FOREIGN PATENT DOCUMENTS

CN    102656079 A    9/2012
CN    102762437 A    10/2012
(Continued)

OTHER PUBLICATIONS

International Search Report and Written Opinion of PCT/EP2014/074689. filed Dec. 12, 2010, dated Jul. 30, 2015.
(Continued)

*Primary Examiner* — Hilary L Gutman
(74) *Attorney, Agent, or Firm* — Squire Patton Boggs (US) LLP

(57) ABSTRACT

A beam provided with at least one first part that has a main body with an overall U-shaped straight cross-section provided with lateral flanges protruding outwards from the sides of the U, the main body further comprising a bottom part as well as two wings forming the sides of the U.

(Continued)

The central portion of the main body defines cells working under tension and under compression, respectively, on either side of a neutral main bending axis formed by two transition zones, which are each located between the U-shaped element and a lateral flange.

The bottom part of the main body comprises at least one transition formed by a curvature discontinuity. And at least one wing comprises at least one transition formed by a curvature discontinuity.

13 Claims, 13 Drawing Sheets

(51) Int. Cl.
  *B62D 21/15* (2006.01)
  *B60R 19/18* (2006.01)
(52) U.S. Cl.
  CPC .... *B62D 25/025* (2013.01); *B60R 2019/1806* (2013.01)
(58) Field of Classification Search
  USPC ........................................................ 296/205
  See application file for complete search history.

(56) References Cited

U.S. PATENT DOCUMENTS

| | | | |
|---|---|---|---|
| 8,123,286 B2 | 2/2012 | Furusako et al. | |
| 8,651,562 B2 | 2/2014 | Zörnack et al. | |
| 8,684,449 B2 * | 4/2014 | Bodin | B62D 29/007 296/187.12 |
| 8,845,009 B2 | 9/2014 | Kurokawa | |
| 8,911,004 B2 | 12/2014 | Yao | |
| 8,967,703 B2 * | 3/2015 | Wawers | B62D 21/157 296/193.06 |
| 2003/0000156 A1 | 1/2003 | Morello et al. | |
| 2012/0119477 A1 | 5/2012 | Kim | |
| 2012/0256445 A1 | 10/2012 | Baccouche et al. | |

FOREIGN PATENT DOCUMENTS

| | | | | |
|---|---|---|---|---|
| CN | 202783402 U | | 3/2013 | |
| DE | 100 07 358 | | 8/2001 | |
| DE | 10 2009 047956 | | 4/2011 | |
| DE | 102015106812 A1 | * | 11/2016 | ........... B62D 29/008 |
| EP | 1498345 | | 1/2005 | |
| JP | H04 56688 | | 2/1992 | |
| JP | H08 188174 | | 7/1996 | |
| WO | WO 2011/071434 | | 6/2011 | |
| WO | WO-2015071412 A1 | * | 5/2015 | ........... B62D 25/025 |
| WO | WO-2015130206 A1 | * | 9/2015 | ........... B23K 11/115 |
| WO | WO-201610744 A1 | * | 9/2016 | |

OTHER PUBLICATIONS

Translation of the Written Opinion for PCT/EP2014/074689, dated Jul. 30, 2015, 6 pp.

* cited by examiner

| Section | Mass | Mmax | Absorbed energy |
|---|---|---|---|
| A | Base | Base | Base |
| B | +4% | +8% | +13% |
| E | +5% | +20% | +10% |
| F | +5% | +17% | +20% |
| G | +6% | +23% | +28% |
| H | +6% | +20% | +52% |

FIG. 7

FIG. 9a
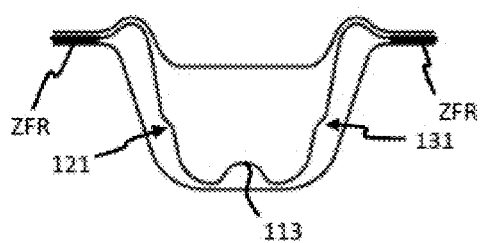
FIG. 9b
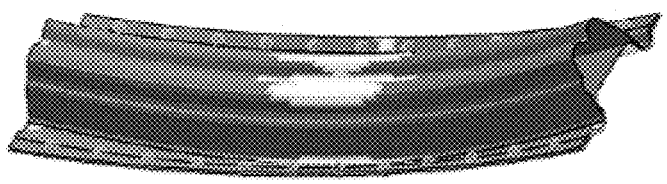
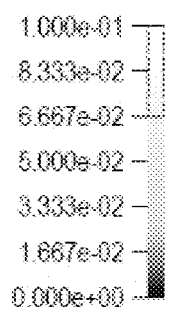
FIG. 9c
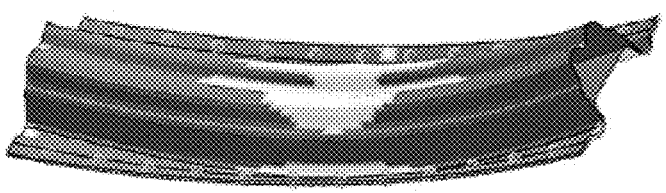
FIG. 9d
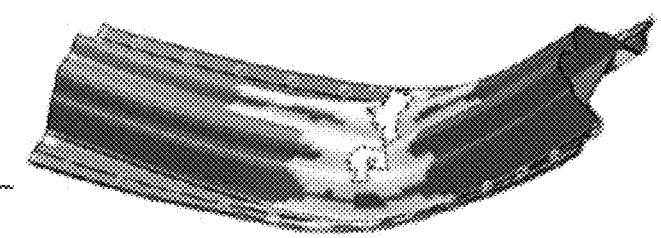

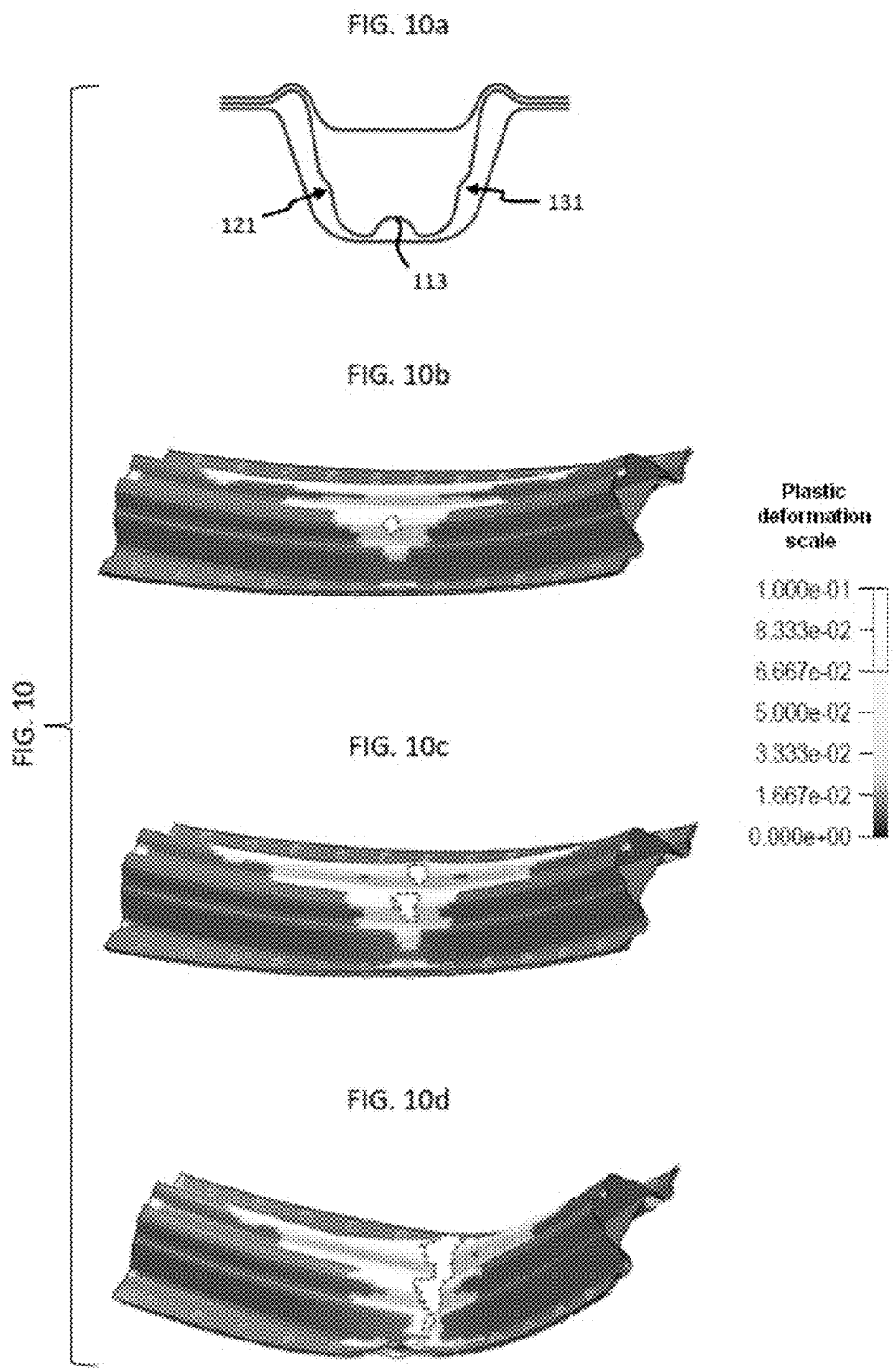

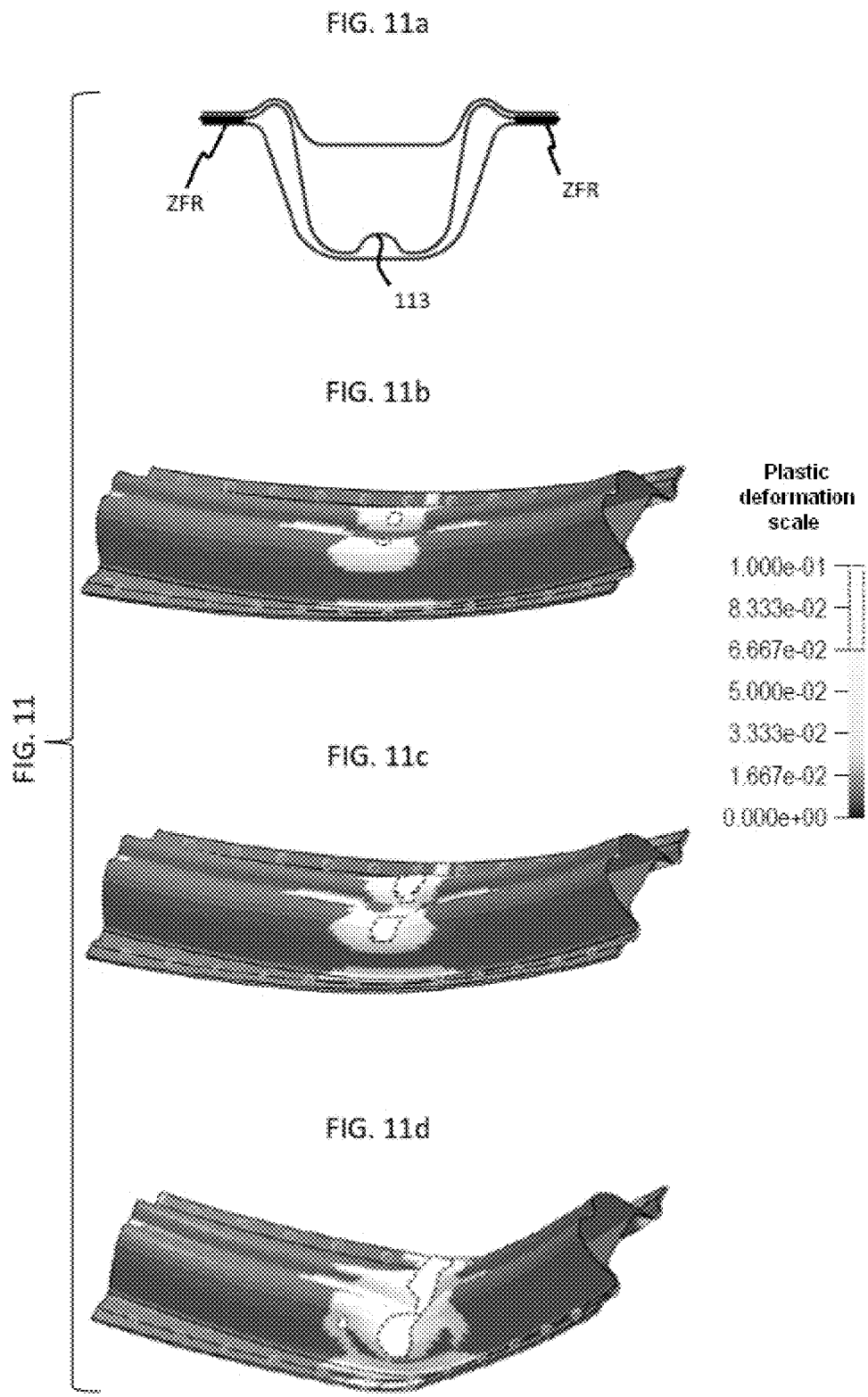

FIG. 12a
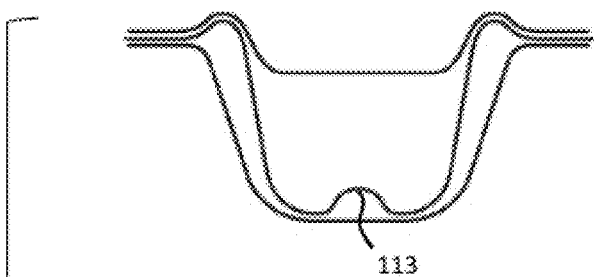
FIG. 12b
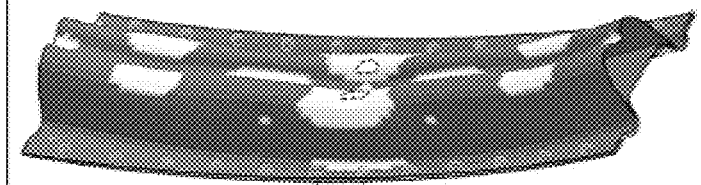
FIG. 12c
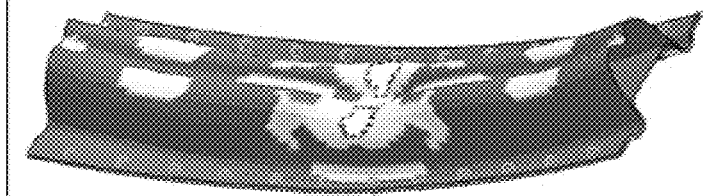
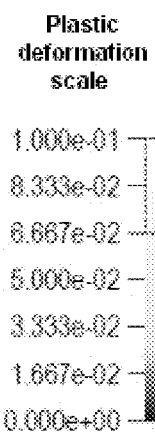
FIG. 12d
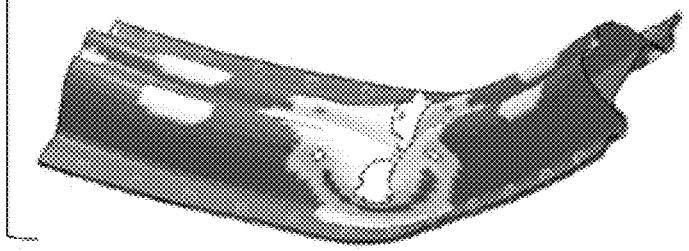
FIG. 12

| Section | Mass | Mmax | Absorbed energy |
|---|---|---|---|
|  | Base | Base | Base |
| 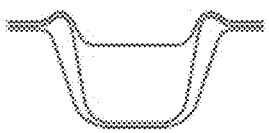 | + 4% | + 8% | + 13% |
|  | + 5% | + 20% | + 10% |
|  | + 5% | + 17% | + 20% |
|  | + 6% | + 23% | + 28% |
|  | + 6% | + 20% | + 52% |
FIG. 14

BEAM FOR PRODUCING A METAL FRAMEWORK

FIELD OF THE INVENTION

The present invention relates to the field of metal parts involved in the realization of a metal framework, in particular a vehicle chassis or vehicle bodywork.

STATE OF THE ART

Many metal beams for the bodywork of a vehicle have already been made.

Particularly, realizing such beams by assembling two metal parts, for example one first part having a main body with an overall straight U-shaped cross-section provided with lateral flanges protruding outwards from the sides of the U and a second part formed by a cover plate has been proposed. The advantage of making the final beam by assembling two parts is mainly due to the freedom thus provided of having and combining in the design, blanks with different thickness and/or formed by different materials and thus obtaining a precise definition of the mechanical features of the final product, while generally reducing the total weight of the beam, with regards to the classical techniques of the prior art.

Generally, the two aforementioned parts are fixed to one another by welding, usually by welding spots distributed along the length of the parts at the level of overlapping flanges, which may coincide with the aforementioned lateral flanges.

Document WO 2011/071434 describes a beam such as the one illustrated in the attached FIG. 1.

This beam comprises a first hat-shaped part 10 provided with a body 12 with overall U-shaped straight cross-section equipped with lateral flanges 14, 15 protruding outwards from the sides of the U and a second part 20 formed by a cover plate.

The document specifies that the core 22 of the plate 20 may be flat or shaped as illustrated in FIG. 1.

The beam may optionally be further provided with a cladding part 30.

Documents US 2012/119477, US 2003/000156, US 2001/024054, DE 10 2009 047956, US 2013/300155, JP H04 56688, US2011/163571, GB 2 497 396 and US2013/140851 describe other part variants.

SUMMARY OF INVENTION

The aim of the invention is to propose a new part geometry to ensure good strength and stiffness while reducing the mass of the material used and optimizing the energy absorption capacity in the event of deformation under an impact.

The aforementioned aim is obtained according to the invention thanks to a beam provided with at least one first part having a main body with an overall U-shaped straight cross-section equipped with lateral flanges protruding outwards from the sides of the U, the main body further comprising a bottom part as well as two wings forming the sides of the U, characterized in that:
  the central portion of the main body defines cells working under tension and under compression, respectively, on either side of a neutral main bending axis, formed by two transition zones which are each located between the U-shaped element and a lateral flange;
  the bottom part of the main body comprises at least one transition formed by a curvature discontinuity;
  at least one wing comprises at least one transition formed by a curvature discontinuity;
  at least one lateral flange comprises at least one zone having a lower mechanical strength than the rest of the main body, said at least one zone of the lower mechanical strength zone being provided on the same side of the U as the wing comprising said at least one transition.

As discussed below, thanks to a redistribution of the constituent material of the main body, about the main bending axis of the body, and to a technical synergy between the at least one low mechanical strength zone provided on at least one lateral flange and the at least one aforementioned transition, specifically provided on at least one wing of the main body, the invention enables the mass of the beam to be significantly reduced while improving the mechanical properties with regards to the prior art, specifically enabling the absorbed energy to be substantially increased in the event of a deformation under an impact.

According to other advantageous characteristics, but not in any way limiting the invention:
  each of the wings comprises at least one transition, and each of the lateral flanges comprises at least one zone of the lower mechanical strength zone;
  the cells working under tension and the cells working under compression each have a concavity oriented towards the neutral main bending axis;
  the beam has an axis of symmetry;
  the beam has an asymmetry;
  the beam further comprises zones with lower mechanical strength than the rest of the main body at the level of the wings and/or bottom part of the U-shaped main body, for controlling the deformations;
  in addition, the beam comprises a cover plate;
  the bottom part comprises at least two planar segments of which each planar segment has a width that is less than or equal to 1.9 t. $\sqrt{E/sy}$, wherein t represents the thickness of the part, E represents the Young's modulus of the part material and sy represents a parameter of mechanical strength known as the elastic limit, which is typically equal to 1100 MPa;
  the transition zones are formed by a curving;
  at least one wing comprises at least one transition located between 50-90% of the height of the main body;
  at least one wing comprises at least one transition shaped as a double rounded elbow, which comprises one inflexion point, or one transition forming one rectilinear segment that joins each of the ends of said at least one wing thus forming an angle.

BRIEF DESCRIPTION OF THE DRAWINGS

Other features, aims and advantages of the invention will become apparent upon reading the following detailed description, with reference to the attached drawings, provided by way of non-limiting examples, wherein:

FIG. 5a shows on the curves 1b, 1c and 1d respectively the bending moment under a four-point bending emulating a lateral impact of a part forming a B-pillar of a vehicle bodywork; the curves 2b and 2c represent similar curves under a four-point bending emulating a vehicle roll-over respectively for a reference part illustrated in FIG. 5b and the intermediate part shown in FIG. 5c; and curves 3b and 3c represent the moment under a three-point bending test for parts corresponding respectively to the reference part illustrated in FIG. 5b and the intermediate part shown in FIG. 5c;

FIG. 7 shows a table that compares the embodiment displayed in FIG. 2 with different types of parts;

FIG. 9.a shows a transverse cross-sectional view of a part similar to the embodiment shown in FIG. 2;

FIGS. 9.b, 9.c and 9.d show the distribution of the mechanical stresses as well as, the deformation of a part similar to the embodiment displayed in FIG. 2, which is subject to a four-point bending;

FIG. 10.a shows a cross-sectional view of a part similar to the embodiment shown in FIG. 2, but wherein said part does not comprise any zone of the lower mechanical strength zones on the lateral flanges;

FIGS. 10.b, 10.c and 10.d show the distribution of the plastic deformations of a part subjected to a four-point bending, said part being similar to the embodiment displayed in FIG. 2, but it does not comprise a zone of the lower mechanical strength zones on the lateral flanges;

FIG. 11.a shows a transverse cross-sectional view of a part similar to the embodiment shown in FIG. 2, but wherein said part does not comprise any transition on the wings;

FIGS. 11.b, 11.c and 11.d show the distribution of the plastic deformations of a part subjected to a four-point bending, said part being similar to the embodiment displayed in FIG. 2, but it does not comprise any transition on the wings;

FIG. 12.a shows a transverse cross-sectional view of a part similar to the embodiment shown in FIG. 2, but wherein said part does not comprise any transition on the wings, nor zone of the lower mechanical strength zones on the lateral flanges;

FIGS. 12.b, 12.c and 12.d show the distribution of the plastic deformations of a part subjected to a four-point bending, said part being similar to the embodiment displayed in FIG. 2, but it does not comprise any transition on the wings, nor zone of the lower mechanical strength zones on the lateral flanges;

FIG. 14 shows a table that compares the embodiment displayed in FIG. 3 with different types of beams.

DETAILED DESCRIPTION OF THE EMBODIMENTS

Figure 2:
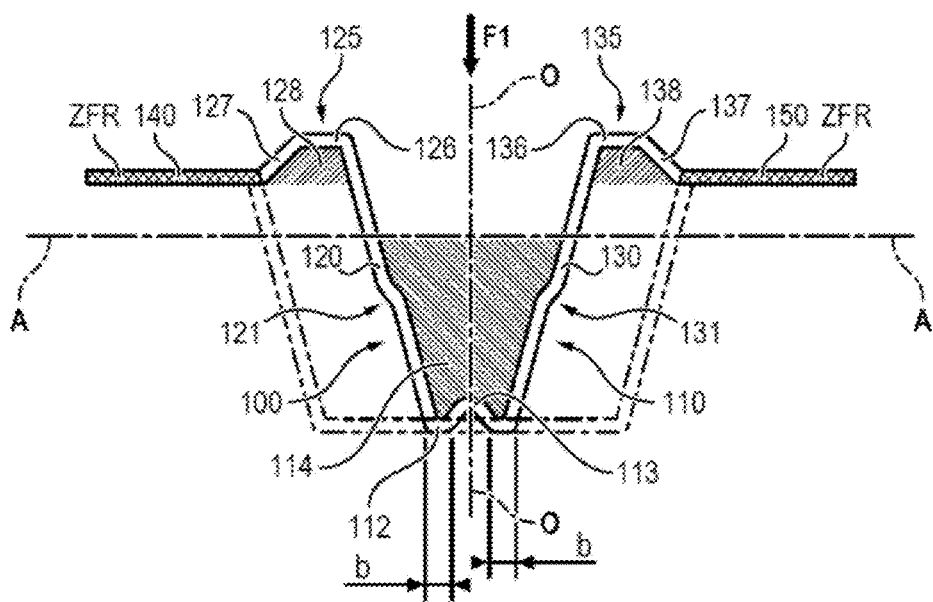
FIG. 2 shows a similar transverse cross-sectional view of a part according to the present invention.
Figure 3:
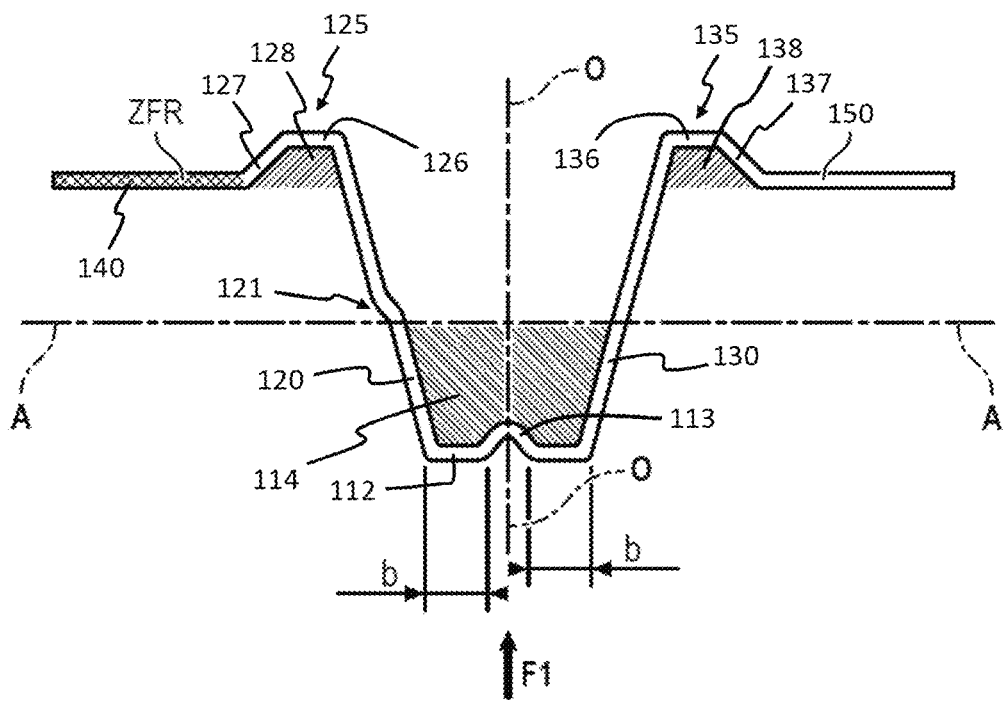
FIG. 3 shows a similar transverse cross-sectional view of a part according to the present invention, corresponding to an embodiment different to that shown in FIG. 2.

FIGS. 2 and 3 show, with solid lines, the straight cross-section of a beam according to the present invention and, in dotted lines, the straight cross-section of a beam according to the prior art.

According to a particular embodiment shown in FIG. 2, the cross-section of the beam has an axis of symmetry O-O.

As may be seen in FIG. 2, the axis of symmetry O-O constitutes an elastic neutral axis and the cross-section of the beam according to the invention illustrated in FIG. 2 further comprises a main elastic neutral bending axis A-A. These elastic neutral axis O-O and main elastic neutral bending axis A-A extend into the cross-section of the beam perpendicularly to the longitudinal axis of the beam.

The "elastic neutral main bending axis A-A" is understood to be the equilibrium axis of the moments resulting from a bending deformation due to the resulting shear stress along the axis O-O and/or a bending moment about the axis A-A.

The main elastic neutral bending axis A-A is orthogonal to the elastic neutral axis O-O.

Figure 4:
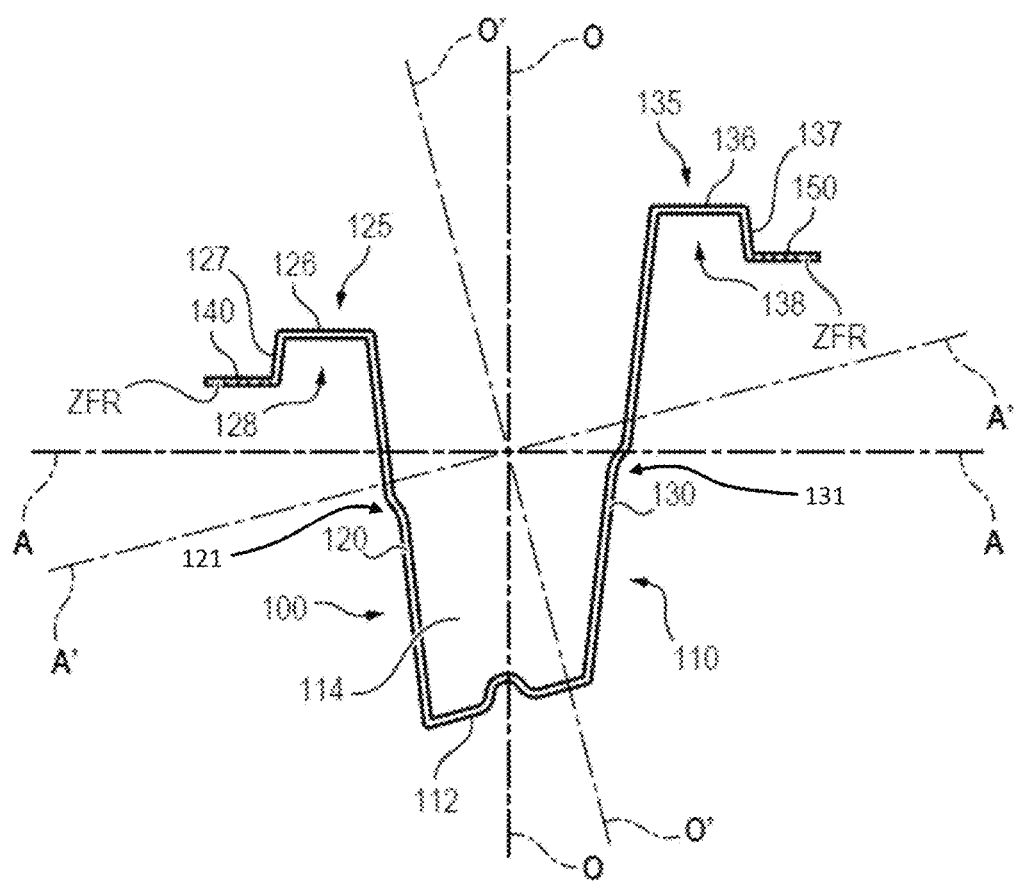
FIG. 4 shows a schematic illustration of a part, without an axis of symmetry, according to the present invention.

In FIG. 4, there is a schematic outline of a variant according to the present invention, without an axis of symmetry.

In said FIG. 4, axis O-O and A-A can be seen crossing at the level of the center of inertia and orthogonal to one another, defining the direction of the stresses and moments applied. Axis O-O defines the axis of the shear stresses and axis A-A defines the axis of the bending moments. The resulting elastic neutral axis O'-O' and A'-A' corresponding to the main axis of inertia are equally represented in FIG. 4.

The beam shown in FIG. 2 comprises a part 100 comprising a main body 110 with an overall U-shaped straight cross-section and two lateral flanges 140, 150.

The U-shaped main body 110 comprises a core or bottom part 112. The bottom part 112 has a general orientation substantially parallel to the main neutral bending axis A-A, thus orthogonal to the axis of symmetry O-O.

Nevertheless, as illustrated in FIG. 2, according to the invention, the bottom part 112 is provided with one or more stiffening ridges 113, preferably directed inwards into the U. More generally, the bottom part 112 may thus be provided with transitions or steps forming a curvature discontinuity, the stiffening ridge 113 of which constitutes an exemplary embodiment.

The core or bottom part 112 does not coincide with the main neutral bending axis A-A, in other words, it is distant from this main neutral bending axis A-A.

The U-shaped main body 110 comprises two wings or walls 120, 130, respectively connected to the two opposite edges of the core 112. The wings 120, 130 cut the main neutral bending axis A-A. The two wings 120, 130 may be globally parallel to the axis of symmetry O-O.

However, the two wings 120, 130 preferably diverge, outbound from the bottom part 112, for example according to an angle of approximately 5 to 30°.

Typically, the two wings 120, 130, cut the main neutral bending axis A-A at two thirds of their length.

In addition, according to the invention, as illustrated in FIG. 2, the wings or walls 120, 130 are provided with transitions or steps 121, 131 forming a curvature discontinuity, depending on the intrinsic stiffness sought for these wings or walls 120, 130. More specifically, the transitions 121, 131 may be made up of a double rounded elbow, which comprises either an inflexion point, or a rectilinear segment that joins each of the ends of the wing 120, 130 forming an angle. These two variants may be combined together, for example, realizing a double rounded elbow that comprises an inflexion point on a rectilinear segment, which joins each of the ends of the wing 120, 130 forming an angle.

In FIG. 3, a variant of a part according to the present invention is shown, wherein the main body 110 only comprises one single transition 121 provided on a wing 120, and said main body 110 only comprises one lower strength zone ZFR on the lateral flange 140.

However, according to other possible variants, the main body 110 may comprise several transitions 121, 131 realized on each one of the wings 120, 130, and said main body 110 may comprise several lower strength zones ZFR realized on each one of the lateral flanges 140, 150.

According to the embodiment illustrated in FIG. 2, the lateral flanges 140, 150 are coplanar and parallel to the main neutral bending axis A-A. However, according to the variant of an embodiment illustrated in FIG. 4, the flanges 140 and 150, while being parallel, are not coplanar. According to FIG. 4, the flange 150 is further from the main neutral bending axis A-A than the flange 140. Moreover, according to FIG. 4, the bottom part 112 is not parallel to this main neutral bending axis A-A.

FIG. 4 is an example of a possible asymmetry applicable to the present invention. However, the invention is not limited to the asymmetry illustrated in FIG. 4 and may be applied to parts having numerous other asymmetries.

According to the invention, as illustrated in FIGS. 2, 3 and 4, the main body 110 further comprises transition elements 125, 135 respectively located between the ends of the wings 120, 130 opposite to the bottom part 112 and the lateral flanges 140, 150. These transition elements 125, 135 define concavities oriented towards the main neutral bending axis A-A According to the particular embodiment shown in FIGS. 2, 3 and 4, these transition elements 125, 135 comprise more specifically each a sheet 126, 136 generally parallel to the main neutral bending axis A-A connected to the end of the wings 120, 130, followed by a wall 127, 137 located between the sheets 126, 136 and the lateral flanges 140, 150, respectively. The walls 127, 137 are inclined relative to the main neutral bending axis A-A, for example at an angle comprised between 10 and 45°. These walls 127, 137 diverge inbound relative to the lateral flanges 140, 150.

By way of non-limiting example, the height of the walls 127, 137 considered in parallel to the axis of symmetry O-O, i. e. perpendicularly to the main neutral bending axis A-A is comprised between ¼ and ⅛ of the height of the wings 120, 130, typically approximately ⅙ of the height of the wings 120, 130.

As may be seen in FIGS. 2, 3 and 4, the partitions 127, 137 on the one hand, and the wings 120, 130 on the other hand, are located on the same side as the sheets 126, 136, in other words, all are located in the direction of the main neutral bending axis A-A from the sheets 126, 136.

Alternatively, the aforementioned transition zones 125, 135 formed by the connection of the planar core 126, 136 and planar partitions 127, 137 may be replaced by equivalent curved means.

The lateral flanges 140, 150 are, in addition, formed by planar sheets, preferably coplanar, perpendicular to the axis of symmetry O-O and parallel to the main neutral bending axis A-A. As a variant, the lateral flanges 140, 150 may be inclined one relative to another and relative to the main neutral bending axis A-A.

A person skilled in the art will understand that the means described above respectively define at the level of the U-shaped main body delimited by the bottom part 112 and the two wings 120, 130, a cell 114 working under tension, or under compression respectively according to the direction of the force exerted, and two cells 128, 138 working under compression, or under tension respectively according to the direction of the force exerted, when a force F1 is applied on the axis of symmetry O-O. The beam according to the invention has been designed for working under flexure following the application of a force F1, which is collinear with the axis of symmetry O-O, it being possible to direct the force F1 in both directions.

In FIG. 2, the aforementioned cells 114, 128 and 138 are schematically represented as shaded areas.

Even more specifically, in the context of the invention, the width b of each planar segment, making up the bottom part 112 considered perpendicularly to the plane of the elastic neutral axis O-O is optimized in order to minimize the mass of material used and it is equal to $$b \leq 1.9 t \sqrt{E/sy},$$

wherein:
t represents the thickness of the part,
E represents the Young's modulus of the material of the part, and
sy represents a parameter of mechanical strength known as the elastic limit, typically equal to 1100 MPa.

In a more general manner, the width b of each planar segment could be expressed as follows:

$$b \leq \sqrt{\frac{4 \times \pi^2}{12 \times (1-n)} \times \frac{E}{sy}} \times t$$

wherein n is Poisson's ratio, which is approximately 0.3 for steel.

Figure 6:
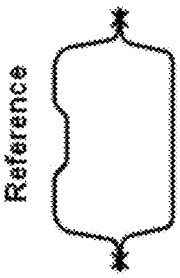
FIG. 6 shows a table that summarizes the maximum moment in kNm under a four-point bending, the mass in kg and the mass gain of two embodiments according to the invention illustrated in the central and right columns, with regards to a reference part illustrated in the left column.

As outlined in FIG. 6, the beam according to the present invention may be complemented with a cover plate 200.

The cover plate 200 may be the object of numerous embodiment variants known by the persons skilled in the art. Therefore, it will not be further described in detail.

According to the embodiment represented in the middle column in FIG. 6, the cover plate 200 is made up of a plate welded on top of the transition zones 125, 135 and said cover plate 200 is itself provided with a stiffening ridge 210 on the center thereof.

According to the embodiment represented in the right column in FIG. 6, the cover plate 200 is in the shape of a U-shaped hat whose lateral flanges 212, 214 are connected to the lateral flanges 140, 150 of the main body 110, the cover plate 200 itself having in these cases a straight U-shaped cross-section whose core comprises a stiffening ridge 210 and the two wings 220, 230 constitute an interface between the core and the lateral flanges 212, 214.

According to another significant feature of the invention, the part according to the invention comprises, namely but not exclusively at the level of these lateral flanges 140, 150, zones with a lower mechanical strength ZFR than the rest of the main body 110.

Preferably, these zones of lower mechanical strength ZFR, are obtained by controlling the temperature of the zones under consideration when the part 100 is being deep-drawn.

Even more specifically, in this context, the zones of lower mechanical strength ZFR are obtained using a method, which consists of:
heating a metal blank at a temperature above the austenitic transition temperature, then
shaping the blank thus heated in a deep-drawing tool provided with a cooling circuit that is controlled and/or shaped for limiting the contact zones with the stamped metal blank.

As a result, the zones of the metal part in contact with the cooled deep-drawing tool convert towards a martensitic phase and have a high mechanical strength, for example above 1400 MPa, for the main body in a general manner, whereas the zones of the metal part not in direct contact with the deep-drawing tool; that is, in contact with the zones of this deep-drawing tool that are locally heated, remain in contact with the air or in contact with a heated zone, are cooled down less, and have conversions between the austenitic and martensitic phases and lastly have a lower mechanical strength, for example below 1100 MPa, typically between 300 and 1000 MPa.

Generally, said zones with a lower mechanical strength ZFR than the rest of the main body 110 may also be formed in locations other than the flanges 140 and 150, for example on the wings or walls 120, 130, even on the bottom part 112.

Figure 5:
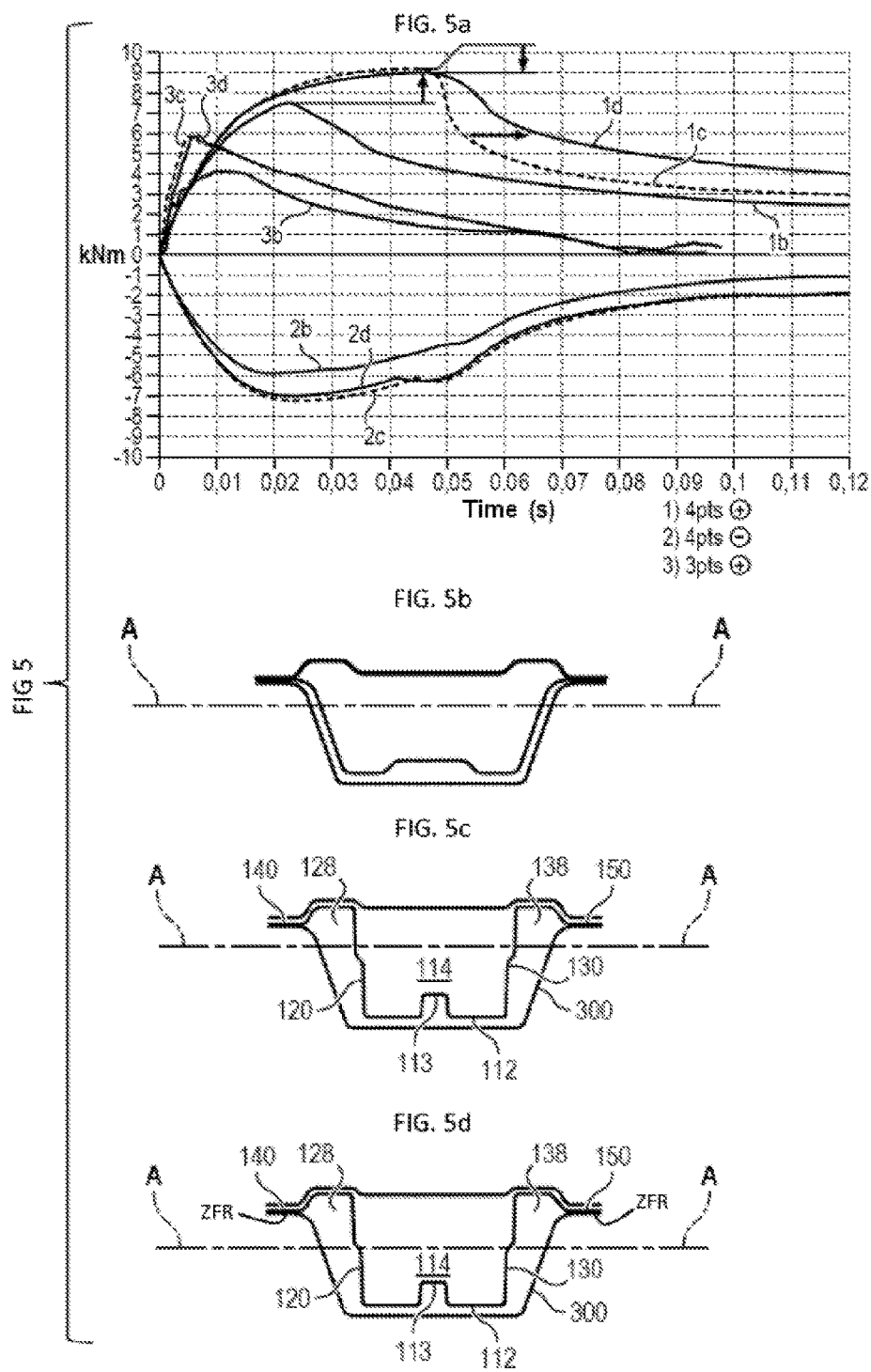
FIG. 5a shows the values of the moments over time for different bending types; respectively of a reference part, illustrated as a transverse cross-sectional view in FIG. 5b, of an intermediate part between the invention and the reference part shown in FIG. 5c and an embodiment according to the invention shown in FIG. 5d; even more specifically

As mentioned above, FIG. 5 represents the moment of a part under different deformation angles.

More specifically, curves 1b, 1c and 1d represent the moment under a four-point bending test corresponding respectively to a lateral impact on a part forming the B-pillar of a vehicle, for a reference part such as the one illustrated in FIG. 5b (curve 1b), an intermediate part between the reference part and the invention that is illustrated in FIG. 5c (curve 1c) and a part according to an embodiment of the invention represented in FIG. 5d (curve 1d).

The intermediate part shown in FIG. 5c, corresponds to a 1.5 mm thick USIBOR steel part.

The part shown in FIG. 5d, corresponds to a 1.8 mm thick USIBOR steel part provided with zone of the lower mechanical strength zones ZFR at the level of its lateral flanges 140, 150.

It should be pointed out here that the parts according to the present invention are parts combining the following four structural features:

1) the main body 110 comprises two transition elements 125 and 135 respectively located between the ends of the wings 120, 130 opposite the bottom part 112 and the lateral flanges 140, 150, so as to define concavities oriented towards the main neutral bending axis A-A, and thus delimit the cells 114, 128 and 138 working under tension and under compression, respectively, on either side of the neutral main bending axis A-A;

2) at least one transition 113 formed by one curvature discontinuity on the bottom part 112 of the U-shaped body 110;

3) at least one transition 121, 131 formed by one curvature discontinuity on each one of the wings 120, 130 of the U-shaped body 121, 131; and 4) zones with a lower mechanical strength than the rest of the U-shaped body 110 on the lateral flanges 140, 150.

The curves 1b, 1c and 1d indicate that the present invention makes it possible to maintain a strength moment higher than that of the reference part illustrated in FIG. 5b.

The same applies to the curves 2b and 2d, which correspond respectively to the moment of the reference illustrated in FIG. 4b and to the embodiment according to the invention represented in FIG. 4d in the case of a vehicle roll-over and regarding FIGS. 3b and 3d corresponding to the same parts under a three-point bending test.

The comparative examination of the two curves 1c and 1d shows that realizing lower mechanical strength zones on the flanges 140, 150 does not significantly change the level of the strength moment (given that the curve 1d shows a maximum moment of the same order of magnitude as that of curve 1c) but enables the energy absorption capacity to be increased and therefore enables a more significant amount of energy to be absorbed.

As illustrated in FIG. 6, where a reference part is compared with two different embodiments according to the invention, which are linked to the cover plates 200, while maintaining a strength moment of the same order of magnitude as that of the reference, the invention makes substantial mass savings possible.

With regards to the reference presenting a maximum moment under a four-point bending test of 7.30 KNm for a total mass of 2.41 Kg, the first embodiment represented in the middle column of FIG. 6 results in a maximum moment under four-points bending of 9.94 KNm for a mass of 2.00 Kg, i.e., a mass gain of 17%, whereas the part according to the second embodiment represented in the right column of FIG. 6 corresponds to a maximum moment under four-points bending of 9.34 KNm for a mass of 1.92 Kg, i.e., a mass gain of 20%.

As mentioned above, the redistribution of the constituent material of the main body 110, around the main bending axis A-A of the body, according to the invention, makes it possible to reach a compromise between an increase in the beam mass, the maximum bending strength, and the energy absorbed during the deformation of the part.

Figure 1:
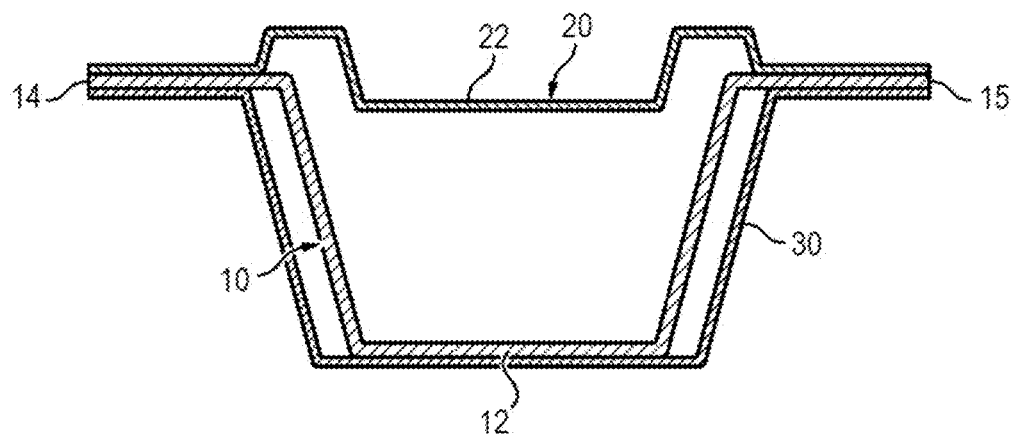
FIG. 1 described above, shows a transverse cross-sectional schematic view of a part according to the prior art.

The table shown in FIG. 7 is a table where the mass, the maximum strength under a four-point bending, and the absorbed energy are compared during the deformation of different part geometries shown in FIG. 1 (part denoted as A in the table) in order to identify the effect of the different structural features of a part (for example the presence of transition zones on the wings) over the mass of the part, the maximum admissible moment, and the energy absorbed during the deformation thereof.

As can be seen for a part referenced as B in the table of FIG. 7, the creation of cells 114, 128 and 138 for realizing two transition elements 125 and 135 allows the maximum admissible moment of part B to be increased by approximately 8%, and the absorbed energy to be increased by approximately 13% as well, during the deformation of said part B, while increasing the mass of said part B only by 4%.

As can be seen for a part referenced as E in the table of FIG. 7, the creation of one transition 113 formed by a curvature discontinuity on the bottom of the U-shaped body 110 of a part E comprising cells 114, 128 and 138 makes it possible to pass to an increase of the maximum admissible moment of approximately 20% (versus 8% without transition 113), but reduces the absorbed energy (10% with a transition 113 versus 13% without said transition 113) and increases the mass of part E (5% with transition 113 versus 4% without said transition 113).

The creation of zones with lower mechanical strength ZFR than the rest of the U-shaped body 110 on the lateral flanges 140 and 150 on a part F comprising one transition 113 on the bottom of the U-shaped body 110, as well as cells 114, 128 and 138, enables the absorbed energy to be increased, passing from an increase of approximately 20% (versus 10% without the zone of the lower mechanical strength zones ZFR on the lateral flanges 140 and 150) without modifying the mass of part F, but reduces the maximum admissible moment (17% with zone of the lower mechanical strength zones ZFR on the lateral flanges 140 and 150 versus 20% without them).

The creation of at least one transition 121, 131 on each one of the wings 120 and 130 forming a curvature discontinuity on one part G comprising one transition 113 on the bottom of the U-shaped body 110, as well as cells 114, 128 and 138, makes it possible on the one hand to increase the maximum admissible moment from an increase of approximately 23% (versus 20% without transitions 121 and 131), and on the other hand makes it possible to increase the absorbed energy to approximately 28% (versus 10% without transitions 121 and 131), but it increases the mass of the part G passing from an increase of approximately 6% (versus 5% without transitions 121 and 131).

One part H according to the invention, which comprises zones with a lower mechanical strength ZFR than the rest of the U-shaped body 110 on the lateral flanges 140 and 150, at least one transition 121, 131 formed by one curvature discontinuity on each one of the wings 120 and 130, one transition 113 on the bottom of the U-shaped body 110, as well as cells 114, 128 and 138 formed by the two transition elements 125 and 135, allows for a 52% increase of the absorbed energy to be obtained relative to part A, a 20% increase of the maximum admissible moment relative to said part A, for a mass that only increases approximately 6% relative to said part A.

Figure 8:
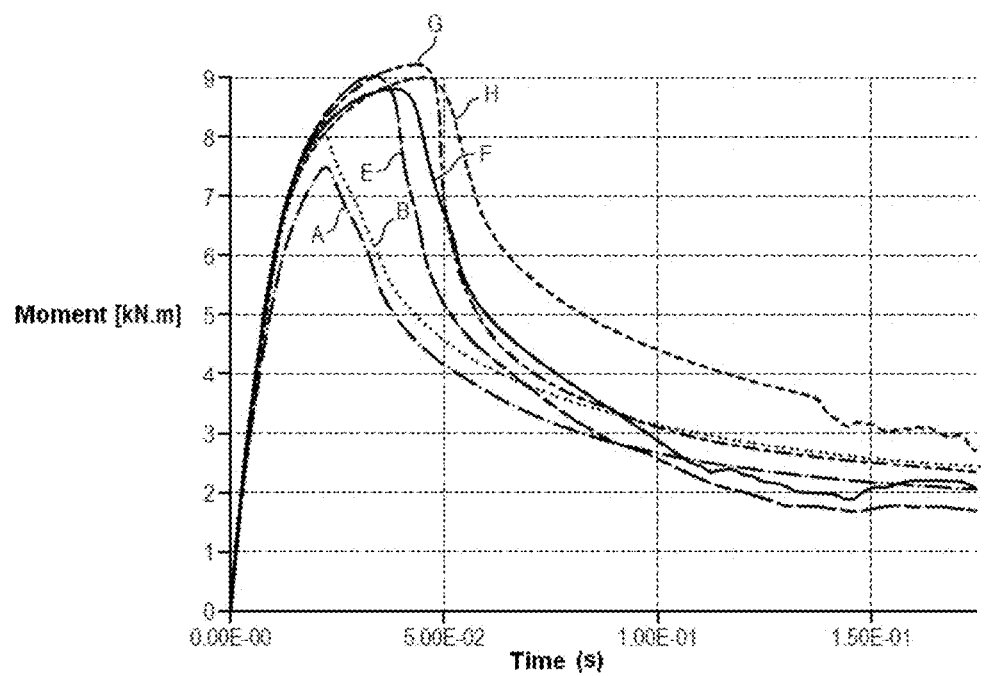
FIG. 8 shows a set of curves representing the result of the four-point bending simulation for the different parts displayed in FIG. 7.
Figure 13:
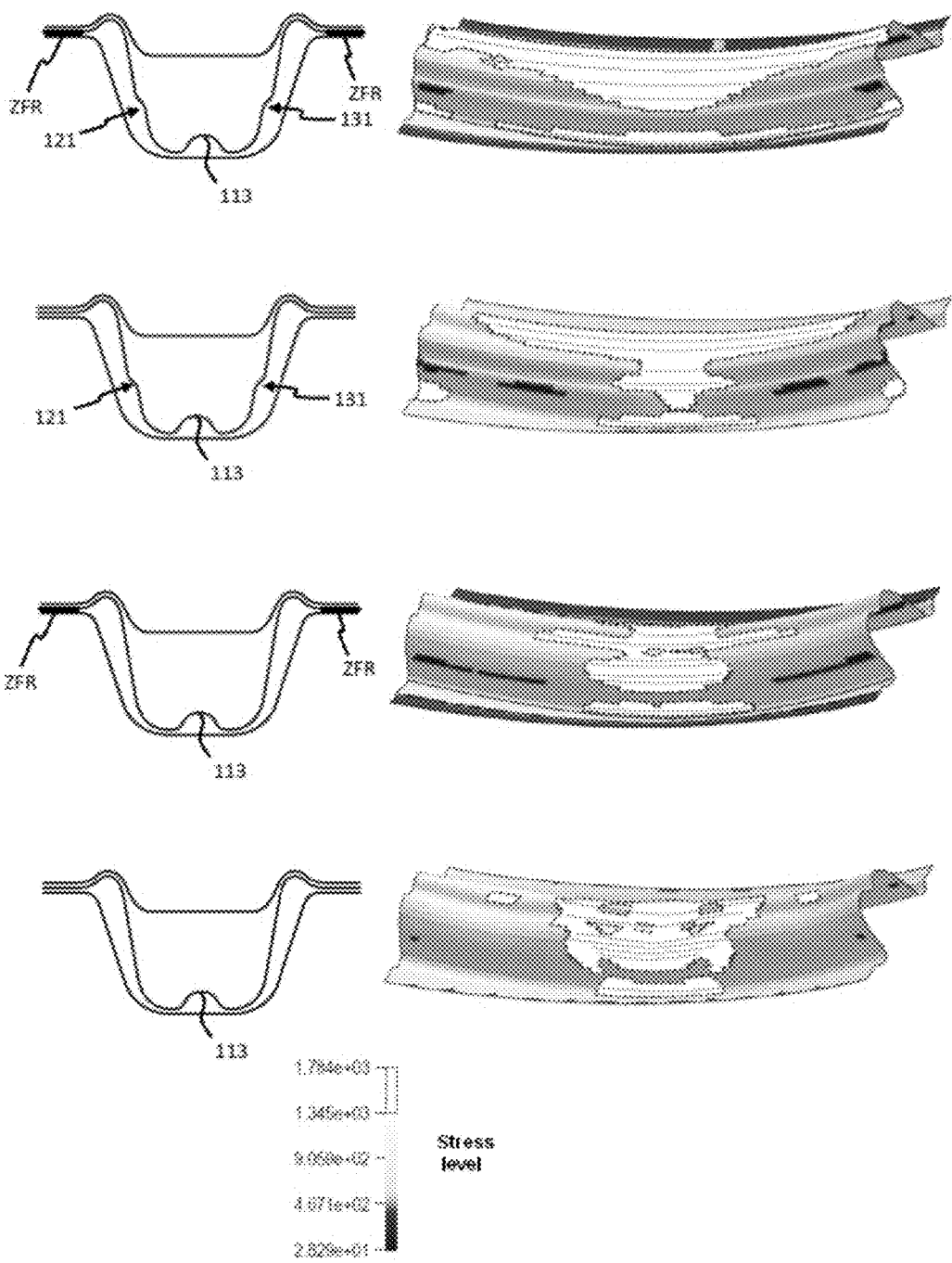
FIG. 13 shows a transverse cross-sectional view of each of the parts illustrated in FIGS. 9, 10, 11 and 12, as well as, a view of the distribution of the mechanical stresses of each one of the parts, which is more detailed than the views shown in FIGS. 9, 10, 11 and 12.

As may be seen in FIG. 8, part H according to the invention has a much higher energy absorption capacity upon the deformation thereof than the other parts A, B, E, F and G.

The applicant has thus observed that the energy absorbed by a part according to the invention is surprisingly higher than the sum of the gain in absorbed energy provided by the creation of least one transition 121, 131 on each of the wings 120 and 130 and the gain in absorbed energy provided by the creation of the lower strength zones on the lateral flanges 140 and 150.

This higher energy absorption of the part according to the invention is due to a synergistic effect between the transitions 121 and 131 located on the wings 120 and 130 and the lower strength zones located on the lateral flanges 140 and 150.

Indeed, as may be seen in FIGS. 9, 10, 11 and 12, the addition of at least one transition 121, 131 on each of the wings 120 and 130 favors a distribution of the compressive stresses along the length of the beam when said beam is subjected to bending. In addition, transitions 121 and 131 allow the wings 120 and 130 to be compressed according to a direction that is collinear to the axis O-O given that the transitions 121 and 131 form the starting point under compression. Such a compression enables, on the one hand, the energy to be absorbed during the compression of the wings 120 and 130 and, on the other hand, enables the spacing between the wings 120 and 130 of the main body 110 to be limited and thus enables the wings 120 and 130 to be maintained in a direction in which the wings 120 and 130 have a higher bending strength.

The creation of the lower mechanical strength zones ZFR located on the lateral flanges 140 and 150 enables the occurrence of plastic deformations in the peripheral zones to be delayed and limit them to a bending zone on which the stresses are at their maximum.

The combination of transitions 121 and 131 on the wings 120 and 130 with the lower mechanical strength zones ZFR located on the lateral flanges 140 and 150 means that:

on the one hand, said transitions 121 and 131 amplify the delaying effect on the occurrence of the plastic deformation on the peripheral zones and limits them to the bending zone provided by the lower mechanical strength zones ZFR located on the lateral flanges 140 and 150, given that the transitions 121 and 131 provide extra strength to the beam, which enables isolation of the bending zone even further from the rest of the beam; and on the other hand, the lower mechanical strength zones ZFR located on the lateral flanges 140 and 150 enable a better distribution of the traction stresses along the length of the part in a complementary manner to the distribution of the compressive stresses caused by the transitions 121 and 131.

In addition, the applicant has realized that the provision of at least one transition formed by a curvature discontinuity on the bottom part 112 of the U-shaped body 110 is necessary so that the transitions 121 and 122, as well as the lower strength zones located on the lateral flanges 140 and 150, enable the maximum bending strength, as well as the energy absorption, to be increased.

As mentioned above, the beam according to the present invention is made of steel.

It may be applied on all the parts involved in the making of a vehicle, for example a B-pillar, a door beam, a bumper beam, a longeron, etc. . . . . .

Naturally, the present invention is not limited to the embodiments described above but extends to any variant within the essence thereof.

As represented in FIG. 5*d*, the beam according to the present invention may be further provided with a cladding part 300 on the outside of the U-shaped main body 110. Such optional cladding part 300 does not substantially affect the total mechanical strength of the part.

In addition, as represented in the table of FIG. 14, the applicant has realized that such synergistic effect is also obtained by a beam on which only the wing 120 comprises a transition 121, whereas the wing 130 does not comprise any transition, likewise, said beam only comprises a zone of the lower mechanical strength zone ZFR on the lateral flange 140, whereas the lateral flange 150 does not comprise any zone of the lower mechanical strength zone ZFR.

The position of the transitions 121, 131 on the wings 120, 130 may be located between 50-90% of the height of the main body 110. Advantageously, the transitions 121, 131 may be located between 60-80% of the height of the main body 110, even more advantageously at approximately 70% of the height of the main body 110.

It should be understood that 0% of the height of the main body 110 corresponds to the position of the lateral flanges 140 and 150, and that 100% of the height of the main body 110 corresponds to the position of the bottom part 112.

Lastly, the main body 110 may also have either a straight constant cross-section along its entire length or a straight cross-section that evolves following the length of said main body 110.

The invention claimed is:

1. A beam provided with a main body having a U-shaped cross-section (U) and lateral flanges protruding outwards from sides of the U, the main body further comprising a bottom part of the U as well as two wings forming the sides of the U, the main body comprising:

a central portion defining cells adapted to work under tension and under compression, respectively, on either side of a main neutral bending axis, wherein the central portion includes two transition zones defining two of the cells, each of the transition zones being located between one of the sides of the U and a lateral flange;

the bottom part comprising one or more stiffening ridges, directed inwards into the U;

at least one of the wings comprising at least one transition formed in the shape of a double rounded elbow including an inflexion point, or a transition forming a rectilinear segment that joins ends of the at least one of the wings, wherein an angle is formed between the rectilinear segment and the ends of the at least one of the wings; and at least one of the lateral flanges comprising at least one zone with a lower mechanical strength than the rest of the main body, the at least one zone of lower mechanical strength being located on a same side of the U as the at least one of the wings.

2. The beam according to claim 1, wherein each of the wings comprises at least one transition, and each of the lateral flanges comprises at least one lower mechanical strength zone.

3. The beam according to claim 1, wherein the cells working under tension and the cells working under compression each have a concavity oriented towards the main neutral bending axis.

4. The beam according to claim 2, having an axis of symmetry.

5. The beam according to claim 2, having an asymmetry.

6. The beam according to claim 1, comprising zones with a lower mechanical strength than the rest of the main body, wherein the zones with a lower mechanical strength are located at the wings and at the bottom part of the U.

7. The beam according to claim 1, further comprising a cover plate.

8. The beam according to claim 1, wherein one of the transition zones is defined by a sheet and a wall converging towards the main neutral bending axis in a direction of the lateral flanges.

9. The beam according to claim 1, wherein the transition zones are formed by a curving.

10. The beam according to claim 9, wherein at least one wing comprises at least one transition located between 50-90% of the height of the main body.

11. The beam according to claim 1, wherein a cross-section of the main body changes along a length of the main body.

12. The beam according to claim 1, wherein the at least one zone of lower mechanical strength has a mechanical strength between 300 MPa and 1000 MPa.

13. A beam provided with a main body having a U-shaped cross-section (U) and lateral flanges protruding outwards from sides of the U, the main body further comprising a bottom part of the U as well as two wings forming the sides of the U, the main body comprising:

a central portion defining cells adapted to work under tension and under compression, respectively, on either side of a main neutral bending axis, wherein the central portion includes two transition zones defining two of the cells, each of the transition zones being located between one of the sides of the U and a lateral flange;

the bottom part comprising one or more stiffening ridges, directed inwards into the U;

at least one of the wings comprising at least one transition formed in the shape of a double rounded elbow including an inflexion point, or a transition forming a rectilinear segment that joins ends of the at least one of the wings, wherein an angle is formed between the rectilinear segment and the ends of the at least one of the wings; and at least one of the lateral flanges comprising at least one zone with a lower mechanical strength than the rest of the main body, the at least one zone of lower mechanical strength being located on a same side of the U as the at least one of the wings;

wherein the bottom part comprises at least two planar segments, each planar segment having a width less than or equal to $1.9\, t\sqrt{E/sy}$, where t represents a thickness of the bottom part, E represents Young's modulus of the bottom part material and sy represents the elastic limit of the material.

* * * * *